(12) United States Patent
Shiraishi (10) Patent No.: US 7,114,238 B2
(45) Date of Patent: Oct. 3, 2006

(54) FABRICATION METHOD FOR A MULTI-LAYER SUSPENSION

(75) Inventor: Masashi Shiraishi, Dongguan (JP)

(73) Assignee: SAE Magnetics (H.K.) Ltd., Shatin (HK)

( * ) Notice: Subject to any disclaimer, the term of this patent is extended or adjusted under 35 U.S.C. 154(b) by 167 days.

(21) Appl. No.: 10/273,638

(22) Filed: Oct. 18, 2002

(65) Prior Publication Data
US 2003/0074782 A1    Apr. 24, 2003

Related U.S. Application Data

(62) Division of application No. 09/732,855, filed on Dec. 7, 2000, now Pat. No. 6,700,745.

(51) Int. Cl.
G11B 5/48 (2006.01)
G11B 21/16 (2006.01)

(52) U.S. Cl. .......... 29/603.03; 29/831; 427/388.1; 216/56; 360/244.3; 360/245.8

(58) Field of Classification Search .......... 29/603.03, 29/830, 847, 852, 831, 846, 603.01; 427/372.2, 427/388.1; 216/56; 360/245.8, 245.9, 244.3
See application file for complete search history.

(56) References Cited

U.S. PATENT DOCUMENTS

| | | | |
|---|---|---|---|
| 4,543,295 A | * | 9/1985 | St. Clair et al. ...... 427/388.1 X |
| 5,153,987 A | * | 10/1992 | Takahashi et al. ............ 29/852 |
| 5,635,010 A | * | 6/1997 | Pepe et al. ................. 29/830 X |
| 5,924,193 A | * | 7/1999 | Crumly et al. ................. 29/846 |
| 5,950,306 A | * | 9/1999 | Suzuki et al. .................. 29/852 |
| 5,986,853 A | * | 11/1999 | Simmons et al. ........ 360/245.9 |
| 6,215,622 B1 | | 4/2001 | Ruiz et al. ................ 360/244.3 |

FOREIGN PATENT DOCUMENTS

JP           4-71841        *   3/1992

* cited by examiner

*Primary Examiner*—A. Dexter Tugbang
(74) *Attorney, Agent, or Firm*—Kenyon & Kenyon LLP (57) ABSTRACT

A multi-layer suspension comprised of a rectangular base plate section, a load beam and a flexure, said load beam can be further divided into a bending area adjacent to the base plate and a rigid area contiguous to said bending section, said suspension assembly is made up of three layers, wherein an adhesive layer is sandwiched between two stainless steel layers with parts of one of said stainless steel layers being etched off. The method for making such suspension including the steps of making three layer raw material, etching off parts of the stainless steel, etching off parts of the polyimide, and the forming and de-tab. The structure of multi-layer suspension of the present invention overcomes the problems of etching variations and misalignment exist in the traditional production of the suspension.

2 Claims, 4 Drawing Sheets

FABRICATION METHOD FOR A MULTI-LAYER SUSPENSION

RELATED APPLICATION

This application is a Divisional of patent application Ser. No. 09/732,855, filed on Dec. 7, 2000, and issued as U.S. Pat. No. 6,700,745, on Mar. 2, 2004.

FIELD OF THE INVENTION

The present invention relates generally to suspension for supporting MR head slider over recording media. In particular, the present invention is in connection with head suspension assembly with multi layers.

DESCRIPTION OF THE RELATED ART

The well-known and wildly used suspension includes a load beam having a base plate on a proximal end, a flexure on a distal end, a relatively rigid region adjacent to the flexure and a spring region between the base plate and rigid region. An air-bearing slider including the magnetic head is mounted to the flexure. The magnetic head is carried in a carrier or slider which is pushed gently against the surface of the disk when the disk is not rotating by the suspension assembly. When the disk begins to rotate at high speed, the slider is aerodynamically shaped to fly slightly above or very slightly away from the surface of this rotating disk. When the slider flies slightly away from the rotating disk, the magnetic head contained in the slider is then moved back and forth from track to track by the action of the support assembly holding the slider.

As disk drives have become smaller and smaller in size with increased data storage capacity, data recording density of the disk has gone up dramatically and the data tracks have become smaller and closer from each other. The magnetic heads and sliders have also decreased in size and weight. In order for the heads and sliders to be accurately positioned with respect to a desired track on the magnetic disk, the suspension must be precisely controlled and windage problem must be decreased as low as possible.

Therefore the choice of the spring rate of the bending region plays an important role in the design of the suspension. If the bending region is at high spring rate it will gain slight bending unless it is under a relatively strong force which makes it difficult to control the suspension. On the other side when the spring rate of the bending region is low the suspension can bend deeply under a relatively small force which obviously makes the control of the suspension easier. From this point of view it is desirable for the spring rate of the bending region of the suspension to be certainly controlled on the lower side.

Meanwhile the resonance characteristics must also be taken into consideration in the design of the suspensions. An inherent property of moving mechanical systems, however is their tendency to bend and twist in a number of different modes when driven back and forth at certain rates known as resonant frequencies. Such modes resulting in lateral or transverse motion of the head slider are particularly detrimental since they will cause the head slider to move from the desired track on the disk toward an adjacent track. There three primary modes which produce such motion known as the sway, first torsion and second torsion modes. Since the head suspension assemblies must be driven at high rates of speed in high performance disk drives the windage problems of the suspension and the issues of disk motor vibration will be raised because of mechanical characteristics. Therefore it is desirable for the resonant frequencies of a suspension to be as high as possible. Additionally it is noted that the position, shape and size of the roll or bend in the spring region of the suspension can effect the resonance characteristics.

Technicians in the filed of suspension are seeking various solutions to meet with all the requirements mentioned above. Traditional half-etching method is one among them. During the manufacturing process of the half-etching type of suspensions parts of the stainless steel are etched away along the suspension. However, because of the limits of the chemical etching technique, this will cause large variations in the remaining parts of the stainless steel which will bring detrimental effects to the performance of the suspensions.

Another solution is the four pieces type suspension. This kind of suspension is made up of four pieces known as the base plate hinged in the spring region, the load beam as the rigid region and the flexure. The four separated pieces are combined together to form the complete suspension. In the producing process of this type of suspension two parts of stainless steel are made at different thickness to satisfy different requirements at first. At a latter stage the two parts are combined together by laser welding. Although this method proves to be a satisfying solution to the questions raised in the half-etching type suspension the challenge it met with lies in the alignment of the two parts of different thickness.

THE OBJECT OF THE INVENTION

An object of the present invention is to provide the suspension at a size which fits with the Femto slider that has smaller and lighter weight comparing to the Connectp. to pico slider.

A further object of the present invention is to provide a suspension which can balance between the contradict requirements of the thickness of the suspension in different sections.

SUMMARY OF THE INVENTION

The present invention discloses a suspension assembly comprised of a rectangular base plate section, a load beam and a flexure, said load beam can be further divided into a bending section near the base and a rigid beam section contiguous to said bending area, characterized in that said suspension assembly is made up of three layers, wherein an adhesive layer is sandwiched between two stainless steel layers with parts of one of said stainless layers etched off.

According to another aspect of the present invention a method for fabricating a multi-layer suspension assembly comprising:

a) Sandwiching the polyimide sheet with both sides covered with chemical adhesive reaction between two stainless steel sheets by heating and pressing before the three layer raw material is formed;
b) Etching off parts of the stainless steel along the longitude direction;
c) Etching off parts of the polyimide sheet remained to form individual three layer structures; and
d) Forming the 3-layer suspensions after de-tab.

BRIEF DESCRIPTION OF THE DRAWINGS

The invention will be described in greater detail with reference to the drawings in which.

DESCRIPTION OF THE PREFERRED EMBODIMENT

Figure 1A:
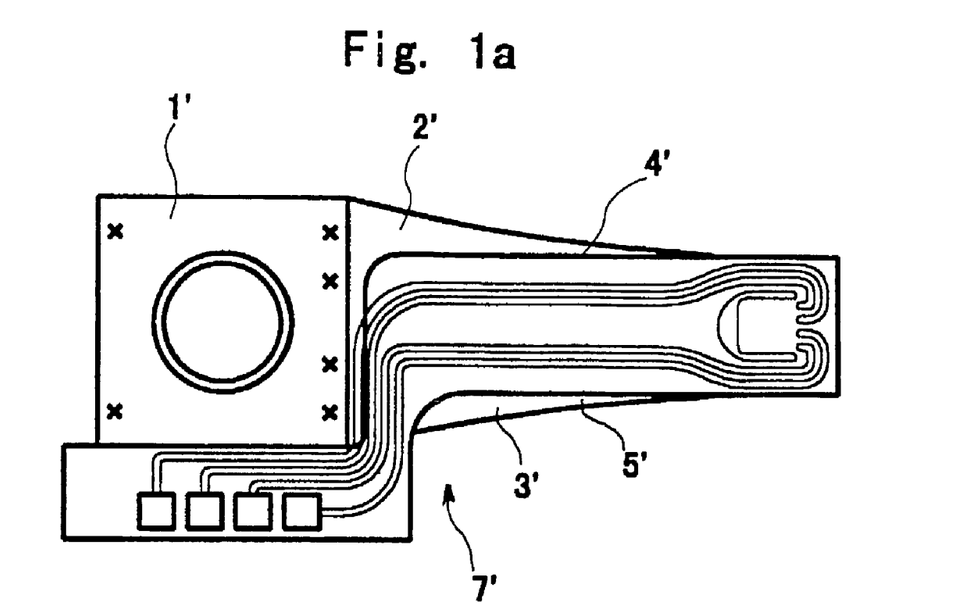
FIG. 1a is a top plane view of the conventional wireless suspension.
Figure 1B:
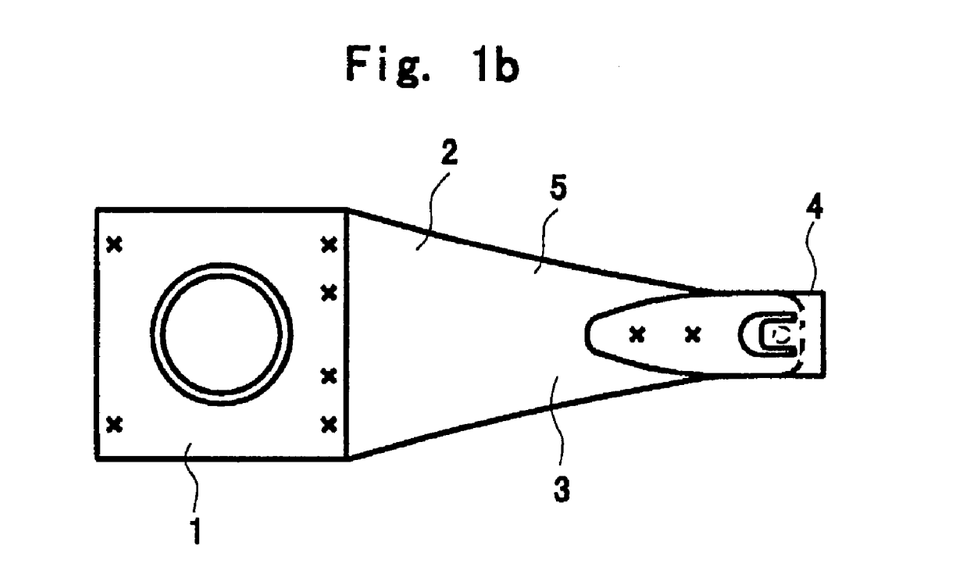
FIG. 1b is a top plane view of the conventional suspension.
Figure 2:
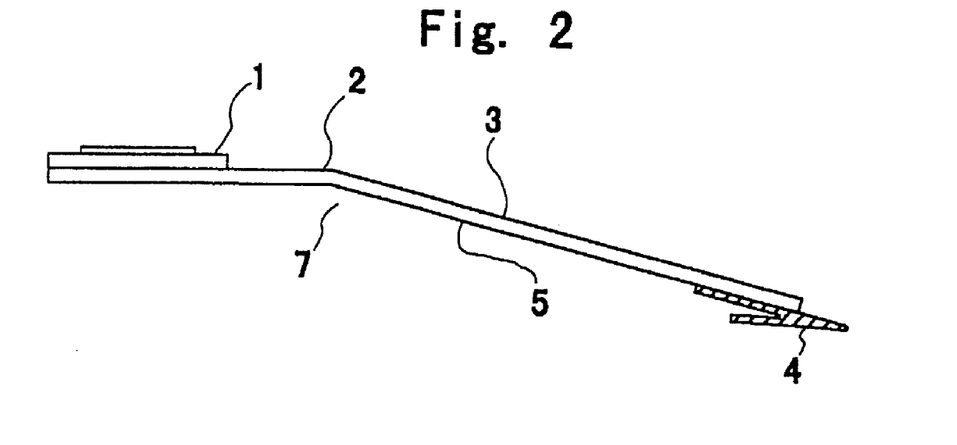
FIG. 2 is a side view of the traditional suspension illustrating the different requirements of the thickness in different parts of the suspension.

FIG. 1a shows the structure of the wireless suspension 7' with wiring traces on its flexure 4'. Under the flexure is the rigid layer 3', the bending region 2' and the load beam 5'. Adjacent to the bending region 2' is the base plate 1'. FIG. 1b and FIG. 2 briefly illustrate the construction of the traditional suspension 7 which includes a rectangular base plate 1, the load beam 5 and a flexure 4. The magnetic head or slider will be carried on the flexure 4. The load beam 5 can be further divided into a bending region 2 laser welded with the base plate 1 and a rigid region 3 between the bending region 2 and the flexure 4. In order to have higher resonance frequency to avoid unwanted vibration as well as remain stiffness of the load beam to prevent unwanted side-to-side yaw movement in the slider it requires the bending region the thinner the better while the rigid region the thicker the better.

Figure 3:
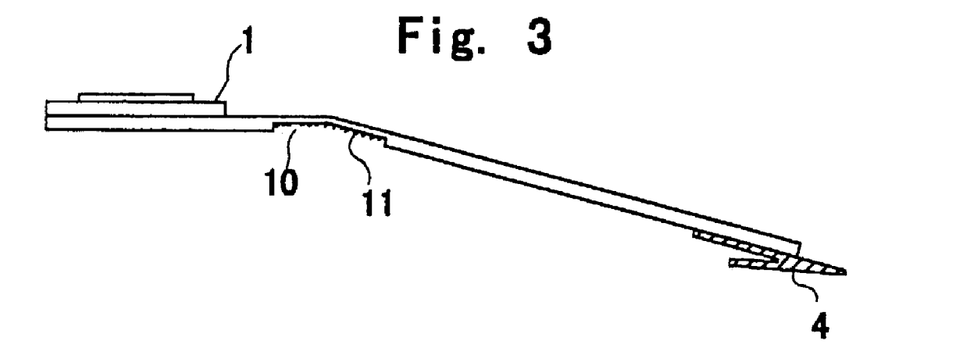
FIG. 3 is a side view of the suspension of the half-etching type.

According to the half-etching method shown in FIG. 3 the suspension is made of a sheet of stainless cutting in the triangle shape. In order to satisfy the different thickness requirements of different sections along the suspension part 10 of the stainless steel is half-etched. Since it is hard to control the thickness of the stainless steel etched away by today's chemical etching technology variations 11 inevitably exist in the remaining part of the stainless steel. As known by the people skilled in the prior art such variations bring detrimental effects to the performance of the suspension.

Figure 4:
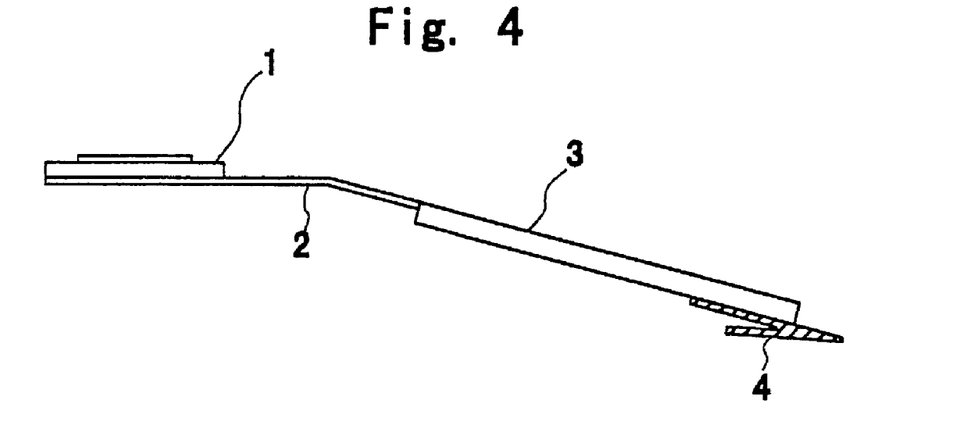
FIG. 4 is a side view of the suspension of the four pieces type.

FIG. 4 illustrates the four pieces type suspension. The suspension of this type is made up of four separated pieces namely base plate 1, spring section 2, rigid section 3 and flexure 4 among which the spring section 2 and the rigid section 3 are of different thickness. Since the four pieces are combined together by laser welding technique the problem of misalignment inherently exists in the connecting portion between different pieces which will make it difficult to control the characteristic of the suspension according to specific requirements.

Figure 5:
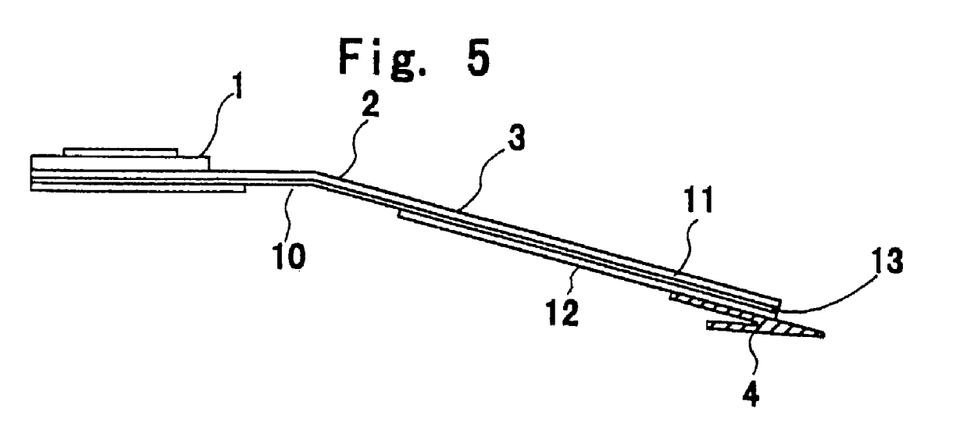
FIG. 5 is a side view of the suspension according to one embodiment of the present invention.

FIG. 5 shows the solution of the present invention. It can be seen from FIG. 5 that the suspension is made up of three layers. The first 11 and the third 12 layers are made of stainless steel with the second layer 13 made of polyimide sandwiched between them. Since the polyimide can't be affected in the etching environment required by the stainless steel it acts as a stopping layer during the etching process. Therefore the thickness of the stainless steel to be etched away along the suspension can be well controlled according to specific requirements. According to FIG. 5 part 10 of the stainless steel layer 12 of the bending area is etched off and no etching is done in the rigid section. In another embodiment shown in FIG. 6 the stainless steel layers 11, 12 of the rigid area are partly etched off and in the bending area only part of the stainless steel layer 12 is etched off. It can be seen from FIG. 5 and FIG. 6 any parts of the stainless steel can be etched off in a flexible way so that it is easy to obtain the desired windage effects of the bending area and retain the stiffness of the rigid section as well according to present invention.

Figure 6:
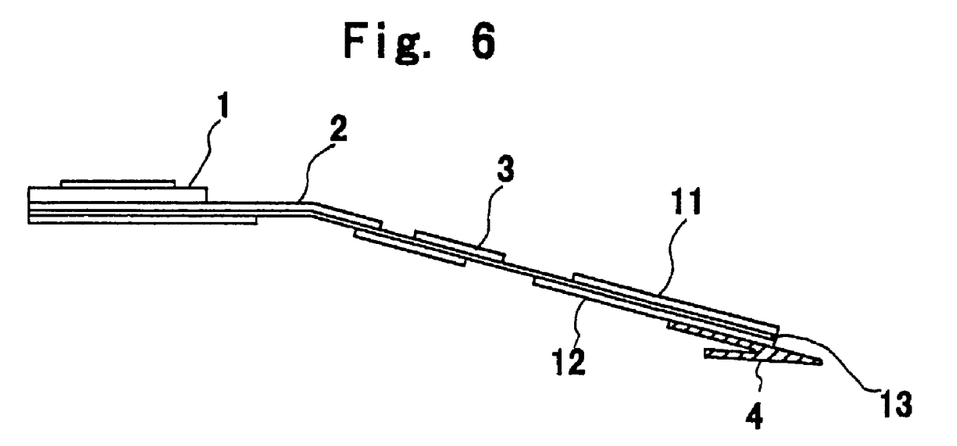
FIG. 6 is a side view of the suspension according to another embodiment of the present invention.

Although the two stainless steel layers 11, 12 are of the same thickness in this specific embodiment they can also be different according to specific requirements while the material of the mid-layer is not limited to polyimide. Other kind of adhesive can be used to achieve the same effects.

The method for forming the multi-layer suspension shown in FIG. 5 and FIG. 6 will be explained with reference to FIGS. 7a–7c as follows.

Figure 7A:
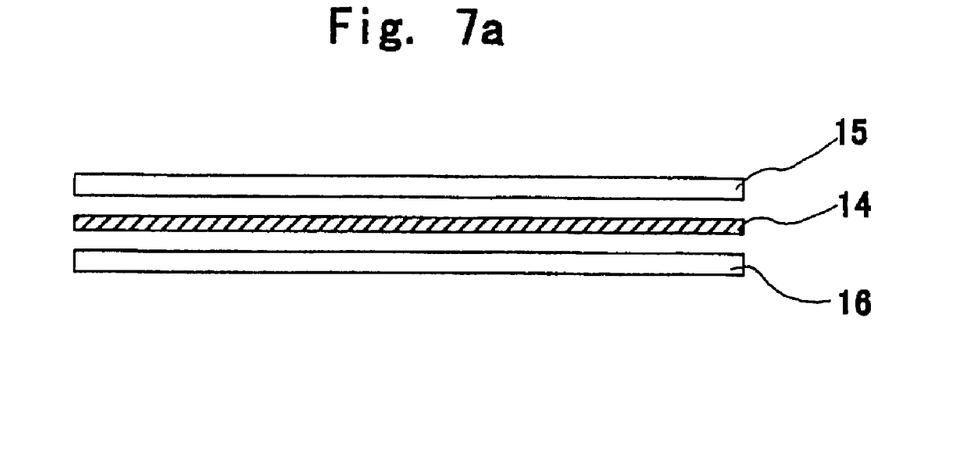
FIG. 7a shows the step for forming the 3-layer raw material in the production procedure of the suspension.
Figure 7B:
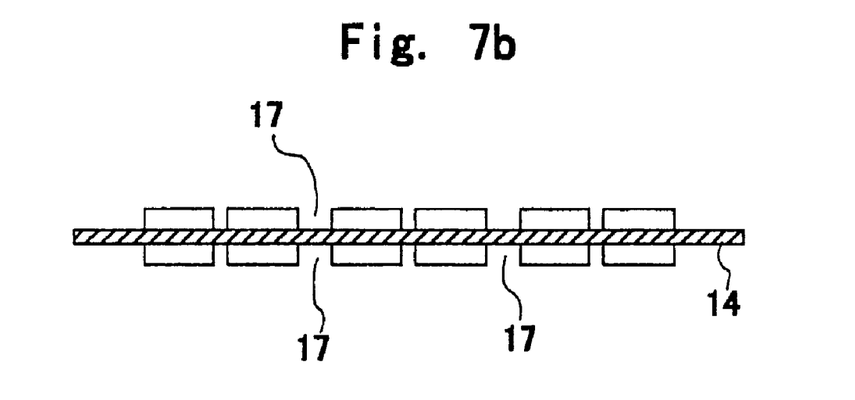
FIG. 7b shows the step for etching-off parts of the stainless steel in the production procedure of the suspension.

FIG. 7a shows the forming of the 3-layer raw material in the production procedure of multi-layer suspension. To make the 3-layer raw material a polyimide sheet 14 with both sides including adhesive chemical reaction is firstly sandwiched between two pieces of stainless steel before they are integrated by heating and pressing. As an alternative method liquid polyimide is coated on one of the thin stainless steel sheet 15 before it is formed as a half-cured film. Upon the half-cured film is placed the other stainless steel sheet 16 by pressing to complete the forming of the 3-layer raw material.

After the three layer raw material is formed as shown in FIG. 7a parts of the stainless steel 17 are etched off using acid such as $FeCl_2$. Since the acid environment required by stainless steel etching will have no effects on the polyimide it acts as a stopping layer when the stainless steel etching is done. Therefore the stainless steel etching can be well controlled to meet with specific requirements this way. FIG. 7b shows the three layer structure with parts of the stainless steel etched away as needed by making multi-layer suspensions.

Figure 7C:
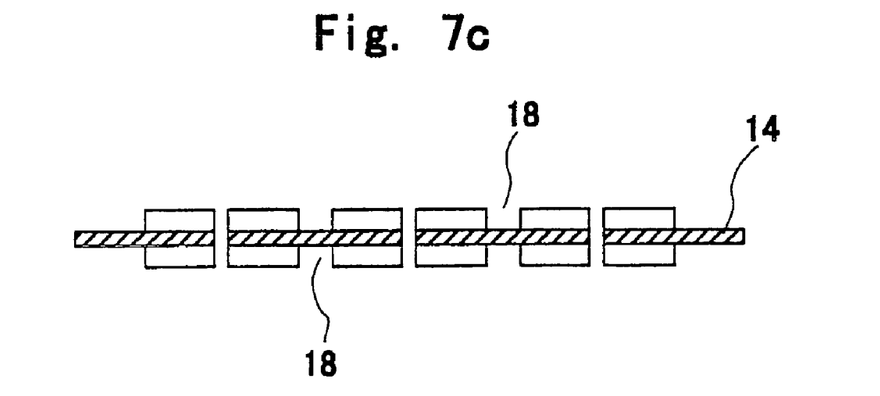
FIG. 7c shows the step for etching-off parts of the polyimide in the production procedure of the suspension.

FIG. 7c shows the step of etching off the polyimide film for the purpose to make individual 3-layers structures. This can be done by using some alkali etching chemical such as KOH or some etching gas such as $O_2$ plasma or $CF_4$ active gas.

On the basis of the individual pieces 18 of 3-layer structure shown in FIG. 7c the suspension desired to obtain finally can be made by subsequent forming and de-tab steps.

ADVANTAGEOUS OF THE PRESENT INVENTION

The problems exist in half-etching type and four pieces type suspension can both be overcome by the present invention. During the producing process of the multi-layer suspension the thickness of the thin material area can be well-controlled comparing the half-etching method. Therefore thickness uniformity can be obtained. Since no additional laser welding is needed according to the present invention the assembly misalignment existed in the four pieces type suspension can also be overcome. Finally since the 3-layer structure can greatly improve the resonance and windage characteristic of the suspensions we can also expect additional damping effects by sandwiched polyimide film.

The invention claimed is:

1. A method for fabricating a multi-layer suspension assembly comprising:
   a) Sandwiching a polyimide sheet with both sides covered with chemical adhesive between two stainless steel sheets by heating and pressing to form a 3-layer raw material;
   b) Etching off parts of the stainless steel sheets along a longitude direction;
   c) Etching off parts of the polyimide sheet remaining to form individual three sheet structures; and
   d) Forming a 3-layer suspension from each individual three sheet structure.

2. A method for fabricating a multi-layer suspension assembly according to claim 1, characterized in that step a) a liquid polyimide is coated on one of the thin stainless steel sheets before the liquid polyimide sheet is formed as a half-cured film; upon the half-cured film is placed the other stainless steel sheet by pressing in order to complete the forming of the 3-layer raw material.

* * * * *

UNITED STATES PATENT AND TRADEMARK OFFICE
CERTIFICATE OF CORRECTION

PATENT NO.         : 7,114,238 B2
APPLICATION NO. : 10/273638
DATED                 : October 3, 2006
INVENTOR(S)       : Masashi Shiraishi It is certified that error appears in the above-identified patent and that said Letters Patent is hereby corrected as shown below:

On the title page item (75), Under Inventor: "Dongguan (JP)" should be --Dongguan (CN)--

On the title page item (57), Abstract, line 14: "misalignment exist" should be --misalignment that exist--

Column 1, line 19: "wildly" should be --widely--

Column 1, line 37: "from" should be --to--

Column 1, line 48: "side" should be --hand,--

Column 1, line 62: "There three" should be --There are three--

Column 2, line 5: "effect" should be --affect--

Column 2, line 7: "filed" should be --field--

Column 2, line 22: "thickness" should be --thicknesses--

Column 2, line 32: "Femto slider that" should be --Femto slider, which--

Column 2, line 34: "comparing to the Connectp. to pico slider" should be --compared to the pico slider--

Column 2, line 53: "comprising:" should be --comprises--

Column 2, line 60: "sheet remained" should be --sheet that remain--

Column 3, line 19: "suspension;" should be --suspension; and--

Column 3, line 37: "remain" should be --maintain--

Column 3, line 39: "region the thinner" should be --region to be the thinner--

Column 3, lines 40-41: "the thicker the better" should be --should be relatively thicker--

UNITED STATES PATENT AND TRADEMARK OFFICE
CERTIFICATE OF CORRECTION

PATENT NO. : 7,114,238 B2
APPLICATION NO. : 10/273638
DATED : October 3, 2006
INVENTOR(S) : Masashi Shiraishi It is certified that error appears in the above-identified patent and that said Letters Patent is hereby corrected as shown below:

Column 3, line 57: "thickness" should be --thicknesses--

Column 4, line 19: "other kind" should be --other kinds--

Column 4, line 47: "3-layers" should be --3-layer--

Column 4, lines 52-53: "in FIG. 7 the suspension desired to obtain finally can be made by subsequent forming and de-tab steps" should be --in FIG. 7 the suspension may be fabricated by subsequent forming and de-tab steps--

Column 4, line 62: "comparing" should be --compared to--

Column 4, line 65: "misalignment existed" should be --misalignment that existed--

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,114,238 B2  Page 1 of 1
APPLICATION NO. : 10/273638
DATED : October 3, 2006
INVENTOR(S) : Masashi Shiraishi It is certified that error appears in the above-identified patent and that said Letters Patent is hereby corrected as shown below:

On the title page item (57),
Abstract, line 14: "misalignment exist" should be --misalignment that exist--

Signed and Sealed this

Nineteenth Day of May, 2009

JOHN DOLL
*Acting Director of the United States Patent and Trademark Office*